United States Patent
Okada et al.

(10) Patent No.: US 6,704,463 B1
(45) Date of Patent: Mar. 9, 2004

(54) INTERPOLATION/DECIMATION APPARATUS, INTERPOLATION/DECIMATION METHOD AND IMAGE DISPLAY APPARATUS

(75) Inventors: Hidehiko Okada, Kanagawa (JP); Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/435,938

(22) Filed: Nov. 9, 1999

(30) Foreign Application Priority Data

Nov. 10, 1998 (JP) .......................................... 10-318548

(51) Int. Cl.$^7$ ................................................ G06K 9/36
(52) U.S. Cl. ...................... 382/300; 382/218; 382/278; 345/606; 358/525
(58) Field of Search ................................ 382/284, 286, 382/287, 291, 293, 294, 298, 299, 300, 190, 209, 218, 219, 252, 255, 266, 275, 278, 220; 345/606, 611, 615; 348/441, 445, 454, 458, 459; 358/525, 532, 537, 463

(56) References Cited

U.S. PATENT DOCUMENTS

| 4,602,285 A | * | 7/1986 | Beaulier et al. ............ 348/580 |
| 4,605,952 A | * | 8/1986 | Powers .................. 375/240.01 |
| 5,315,413 A | * | 5/1994 | Yamamoto et al. .......... 358/512 |
| 5,446,498 A | * | 8/1995 | Boon ........................ 348/448 |
| 5,827,189 A | * | 10/1998 | Mo et al. ..................... 600/454 |
| 5,933,196 A | * | 8/1999 | Hatano et al. ............... 348/441 |
| 5,937,108 A | * | 8/1999 | Harris ........................ 382/298 |
| 6,088,062 A | * | 7/2000 | Kanou et al. ............... 348/441 |
| 6,256,068 B1 | * | 7/2001 | Takada et al. .............. 348/441 |

FOREIGN PATENT DOCUMENTS

| EP | 0 710 016 | 5/1996 |
| EP | 0 969 443 | 1/2000 |
| GB | 2 326 303 | 12/1998 |

OTHER PUBLICATIONS

Kasai et al: "24.6L: Late–News Paper: Development OF 13.3–IN. Super TFT–LCD Monitor" SID 96 DIGEST, May 12, 1996, pp. 414–417, XP000621050.

* cited by examiner

Primary Examiner—Bhavesh M. Mehta
Assistant Examiner—Yosef Kassa
(74) Attorney, Agent, or Firm—Frommer Lawrence & Haug LLP; William S. Frommer; Bruno Polito

(57) ABSTRACT

The invention provides an interpolation processing apparatus and method which can be applied, for example, to a personal computer such that it can prevent deterioration in picture quality arising from a conversion ratio by applying it, for example, to image processing. Weighting coefficients are varied based on phase information of output data with respect to input data and a ratio between the input sample number which forms the input data and an output sample number of corresponding output data.

15 Claims, 17 Drawing Sheets

FIG. 2

| x11 | x12 | x13 | x14 | x15 |
|---|---|---|---|---|
| x21 | x22 | x23 | x24 | x25 |
| x31 | x32 | x33 | x34 | x35 |
| x41 | x42 | x43 | x44 | x45 |
| x51 | x52 | x53 | x54 | x55 |

| y11 | y12 | y13 | y14 | y15 | y16 | y17 | y18 |
|---|---|---|---|---|---|---|---|
| y21 | y22 | y23 | y24 | y25 | y26 | y27 | y28 |
| y31 | y32 | y33 | y34 | y35 | y36 | y37 | y38 |
| y41 | y42 | y43 | y44 | y45 | y46 | y47 | y48 |
| y51 | y52 | y53 | y54 | y55 | y56 | y57 | y58 |
| y61 | y62 | y63 | y64 | y65 | y66 | y67 | y68 |
| y71 | y72 | y73 | y74 | y75 | y76 | y77 | y78 |
| y81 | y82 | y83 | y84 | y85 | y86 | y87 | y88 |

| ORIGINAL IMAGE | FORMAT AFTER CONVERSION | | | | |
|---|---|---|---|---|---|
| | SVGA | XGA | SXGA | UXGA |
| VGA (640×480) | 5/4 | 8/5 | 2/1 | 5/2 |
| SVGA (800×600) | 1/1 | 32/25 | 8/5 | 2/1 |
| XGA (1024×768) | 25/32 | 1/1 | 5/4 | 25/16 |
| SXGA (1280×1024) | 5/8 | 4/5 | 1/1 | 5/4 |
| UXGA (1600×1200) | 1/2 | 16/25 | 4/5 | 1/1 |

FIG. 5

|      | x11 | x12 | x13 | x14 | x15 |     |
|------|-----|-----|-----|-----|-----|-----|
|      | y11 | y13 | y14 y15 | y16 | y18 |     |
|      | y21 | y23 | y24 y25 | y26 | y28 | AR |
| x21  | y31 | y33 | y34 y35 | y36 | y38 |     |
| x31  | y41 | y43 | y44 y45 | y46 | y48 |     |
|      | y51 | y53 | y54 y55 | y56 | y58 |     |
| x41  | y61 | y63 | y64 y65 | y66 | y68 |     |
| x51  | y71 | y73 | y74 y75 | y76 | y78 |     |
|      | y81 | y83 | y84 y85 | y86 | y88 |     |

FIG. 6

| A | B | A | C | C | A | B | A |
|---|---|---|---|---|---|---|---|
| B | D | B | E | E | B | D | B |
| A | B | A | B | A | A | B | A |
| C | E | B | F | F | B | E | C |
| C | E | B | F | F | B | E | C |
| A | B | A | B | B | A | B | A |
| B | D | B | E | E | B | D | B |
| A | B | A | C | C | A | B | A |

| A |   | B | C |   | B |   | A |
|---|---|---|---|---|---|---|---|
|   |   |   |   |   |   |   |   |
| B |   | D |   | E | D |   | B |
|   |   |   |   |   |   |   |   |
| C |   | E |   | F | E |   | C |
| B |   | D | E |   | D |   | B |
|   |   |   |   |   |   |   |   |
| A |   | B | C |   | B |   | A |

INTERPOLATION/DECIMATION APPARATUS, INTERPOLATION/DECIMATION METHOD AND IMAGE DISPLAY APPARATUS

BACKGROUND OF THE INVENTION

This invention relates to an interpolation apparatus, an interpolation method and an image display apparatus and can be applied, for example, to a personal computer or an image display apparatus wherein output data having a sample number different from that of input data are produced by interpolation.

Conventionally, in video apparatus, the format of a video signal or image data is converted and processing for an image such as enlargement or reduction is executed by arithmetic processing by means of an interpolation apparatus.

In particular, a video signal of the NTSC (National Television System Committee) system includes 525 scanning lines for one frame while a video signal of the PAL (Phase Alternation by Line) system includes 625 scanning lines for one frame. Meanwhile, a video signal of the HDTV (High Definition Television) system includes 1,125 scanning lines for one frame.

Therefore, in order to process a different video signal system by different systems, interpolation operation processing is performed to convert the line number of a video signal for one frame to convert the format of the video signal in advance.

Also image data processed by a computer have different formats of various resolutions such as, for example, the VGA (Video Graphic Array) which is the pixel number of 640×480 (dots) and the SVGA (Super VGA) which is the pixel number of 800×600 (dots). Therefore, if it is tried to use, for example, a liquid crystal display panel for the SVGA to display a VGA image on the entire screen of the liquid crystal display panel, then it is necessary to convert the format of VGA image data into SVGA image data by interpolation arithmetic processing for the horizontal direction and the vertical direction.

Also in order to display an image in an enlarged or reduced scale, interpolation operation processing for the direction in which such enlargement or reduction is performed is required similarly.

Such interpolation operation processing is processing for producing image data of pixels (hereinafter referred to as conversion pixels) which form an image after conversion using image data of pixels (hereinafter referred to as original pixels) which form an original image before conversion, and produces image data of conversion pixels by convolution arithmetic operation processing by means of an interpolation filter in accordance with a positional relationship of the conversion pixels with respect to the original pixels.

In particular, taking interpolation operation processing for a horizontal direction as an example, where original pixels Ra, Rb, Rc and Rd are arranged in a juxtaposed relationship at sampling intervals S in the horizontal direction as shown in FIG. 17, image data at a position Q displaced by a distance x from the original pixel Rb toward the original pixel Rc side can be determined, where filter coefficients are represented by Ha, Hb, Hc and Hd, in accordance with the following expression (1):

$$Q = Ha \times Ra + Hb \times Rb + Hc \times Rc + Hd \times Rd \quad (1)$$

Here, theoretical ideal interpolation processing is to perform convolution operation from the infinite past to the infinite future using such a sinc function as illustrated in FIG. 18 as an interpolation function. In FIG. 18, x denotes the position (distance x described hereinabove with reference to FIG. 17) of a conversion pixel normalized with the sampling interval S of the original pixels, and the sinc function is represented by the following expression (2):

$$f(x) = \operatorname{sinc}(x) = (\sin(x))/x \quad (2)$$

However, since the convolution operation from the infinite past to the infinite future is difficult, in actual interpolation operation processing, approximate operation processing is performed to produce image data of conversion pixels.

As such approximation, the most neighborhood approximation, bilinear approximation and Cubic approximation are known. Among them, the most neighborhood approximation allocates image data of the most neighboring original pixel to image date for conversion pixel and a relationship between the original pixel and the conversion pixel is represented by such an interpolation function f(x) as illustrated in FIG. 19. In the most neighborhood approximation, the interpolation function f(x) can be represented by the following expressions (3):

$$f(x) = 1 \quad (-0.5 < x \le 0.5) \quad (3)$$
$$f(x) = 0 \quad (-0.5 \ge x, x > 0.5)$$

Meanwhile, the bilinear approximation produces image data of a conversion pixel by weighted operation processing (weighted meaning processing) using image data of the two most neighboring pixels, and the relationship between the original pixels and the conversion pixel is represented by such an interpolation function f(x) as illustrated in FIG. 20. In the bilinear approximation, the interpolation function f(x) can be represented by the following expressions (4):

$$f(x) = 1 - |x| \quad (|x| \le 1) \quad (4)$$
$$f(x) = 0 \quad (|x| > 1)$$

Further, the Cubic approximation produces image data of a conversion pixel by weighted operation processing using image data of the four most neighboring pixels, and the relationship between the original pixels and the conversion pixel is represented by such an interpolation function f(x) as seen in FIG. 21. In the Cubit approximation, the interpolation function f(x) can be represented by the following expressions (5):

$$f(x) = |x|^3 - 2|x|^2 + 1 \quad (|x| \le 1) \quad (5)$$
$$f(x) = -|x|^3 + 5|x|^2 - 8|x| + 5 \quad (1 < |x| \le 2)$$
$$f(x) = 0 \quad (2 < |x|)$$

It is to be noted that, also in FIGS. 19 to 21, x represents the position (distance x described hereinabove with reference to FIG. 17) of a conversion pixel normalized with the sampling interval S of the original pixels.

Particularly, such an interpolation filter is formed by a FIR digital filter. For example, in production of image data of a conversion pixel by the bilinear approximation, where X=0.0 (that is, an original pixel and the conversion pixel overlap each other), the image data of the conversion pixel can be determined by weighting the image data of the overlapping original pixel with the value 1.0 and weighting the image data adjacent the image data of the original pixel with the value 0.0 and then adding results of the weighting.

Further, in similar production of image data of a conversion pixel, where X=0.5 (that is, the conversion pixel is positioned at the middle point between the two adjacent original pixels), the image data of the conversion pixel can be determined by weighting the image data of the adjacent original pixels both with the value 0.5 and adding resulting values.

Furthermore, where X=0.3, the image data of the conversion pixel can be determined by weighting the image data of the most neighboring original pixel with the value 0.7 and weighting the image data of the next most neighboring pixel with the value 0.3 and then adding results of the weighting.

On the other hand, where the Cubic approximation is employed, a similar FIR digital filter is used and, where X=0.0, the image data of the four successive original pixels are weighted added with the values 0.0, 1.0, 0.0, 0.0. Consequently, the image data of that one of the four original pixels which overlaps with the conversion pixel is outputted as it is.

Where X=0.5, the image data of the four successive original pixels are weighted added with the values −0.125, 0.625, 0.625, −0.125 to produce image data of the conversion pixel. Where X=0.3, the image data of the four successive original pixels are weighted added with the values −0.063, 0.847, 0.363, −0.147 to produce image data of the conversion pixel.

FIG. 22 is a block diagram showing an interpolation apparatus used for such interpolation operation processing by the Cubic approximation as described above. Referring to FIG. 22, in the interpolation apparatus 1 shown, interpolation circuits 1A and 1B convert pixel numbers in a horizontal direction and a vertical direction, respectively. More particularly, in the interpolation apparatus 1, delay circuits (D) 2A to 2D which operate with reference to a clock signal CK1 synchronized with input image data DV1 are connected in series to form a shift register, and the image data DV1 of an original image are successively transferred by the delay circuits 2A to 2D while image data DV1A to DV1D of original pixels of adjacent four samples are outputted in parallel from the delay circuits 2A to 2D, respectively.

A coefficient generation circuit 3 successively produces weighting coefficients for weighting the image data DV1A to DV1D of the four samples based on phase information x (which corresponds to the value x described hereinabove with reference to FIGS. 18 to 21) which results in the phase comparison between the clock signal CK1 synchronized with the original pixels and a predetermined clock signal, and outputs the weighting coefficients in sequence. Multiplication circuits 4A to 4D weight the image data DV1A to DV1D with the weighting coefficients, respectively.

An addition circuit 5 adds weighting results of the multiplication circuits 4A to 4D and outputs image data of a desired pixel number of conversion pixels with regard to the horizontal direction. The succeeding interpolation circuit 1B is formed similarly from delay circuits for one line in place of the delay circuits 2A to 2D for one clock described above, and thus produces image data after conversion, whose pixel number in the vertical direction has been converted, from image data of four samples successive in the vertical direction. A memory 6 stores and outputs image data outputted from the interpolation circuit 1B with reference to a predetermined clock. The interpolation apparatus 1 thereby converts the pixel numbers in the horizontal direction and the vertical direction.

However, interpolation operation processing by the Cubic approximation has a problem in that, as the ratio (hereinafter referred to as conversion ratio) in conversion of the pixel number increases to enlarge the original image, fading of the image after conversion becomes conspicuous and the deterioration of the picture quality becomes conspicuous as much. On the other hand, when the conversion ratio is reduced to reduce the original image, the picture quality is deteriorated by foldover distortion. Consequently, prior to interpolation processing, the image data of the original image must be band limited by means of a low-pass filter.

Meanwhile, similar problems occur also with the bilinear approximation.

On the other hand, the most neighborhood approximation has a problem in that, for example, the thickness of an oblique line varies or the line itself is lost depending upon the conversion ratio and the picture quality is deteriorated similarly.

SUMMARY OF THE INVENTION

It is an object of the present invention to provide an interpolation apparatus and an interpolation method which can be applied, for example, to image processing to prevent deterioration in picture quality arising from a conversion ratio.

In order to attain the object described above, according to an aspect of the present invention, there is provided an interpolation apparatus, comprising interpolation means for weighted adding input data with weighting coefficients to convert the sample number of the input data and outputting resulting data as output data, and weighting coefficient generation means for variably generating the weighting coefficients to be supplied to the interpolation means based on phase information of the output data with respect to the input data and a ratio between the sample number of the input data and the sample number of the output data.

According to another aspect of the present invention, there is provided an interpolation method for an interpolation apparatus which weighted adds input data with weighting coefficients to convert the sample number of the input data and outputs resulting data as output data, comprising the step of variably generating the weighting coefficients to be used in the weighted addition based on phase information of the output data with respect to the input data and a ratio between the sample number of the input data and the sample number of the output data.

According to a further aspect of the present invention, there is provided an image display apparatus, comprising interpolation means for weighted adding input image data with weighting coefficients to convert the sample number of the input image data to produce output image data, and means for outputting the output image data of the interpolation means to a display screen, the interpolation means variably generating the weighting coefficients to be used for the weighted addition based on phase information of the output image data with respect to the input image data and a ratio between the sample number of the input data and the sample number of the output data.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a schematic diagrammatic view showing an area of 5×5 pixels;

FIG. 3 is a schematic diagrammatic view showing an area of 8×8 pixels;

FIG. 4 is a table illustrating integer ratios between pixel numbers in several formats of image data;

FIG. 5 is a schematic diagrammatic view showing the areas of FIGS. 2 and 3 overlapped with each other;

FIG. 6 is a schematic diagrammatic view showing overlapping patterns when the overlap of FIG. 5 is viewed from the image data side of 8×8 pixels;

Figure 8:
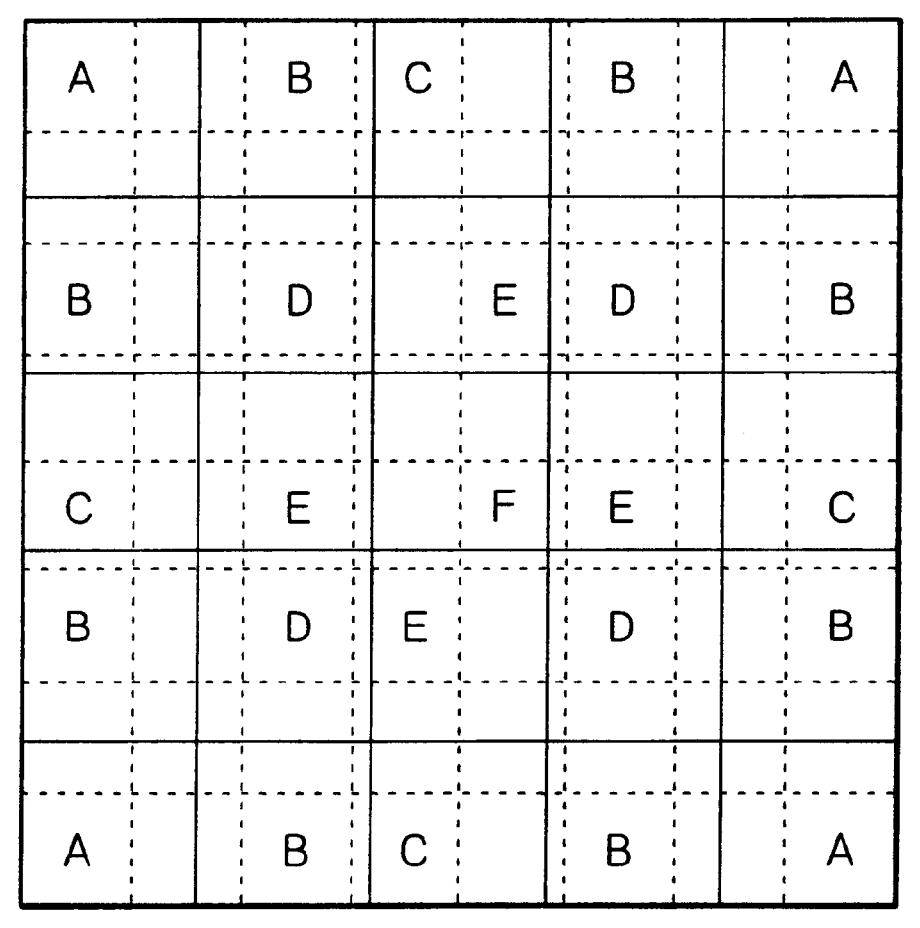

FIG. 8 is a schematic diagrammatic view showing overlapping patterns when the overlap of FIG. 5 is viewed from the image data side of 5×5 pixels;

DESCRIPTION OF THE PREFERRED EMBODIMENTS

1. Basic Principle of Interpolation Processing

FIGS. 2 and 3 illustrate a basic principle of interpolation processing which is employed by the present invention. Referring to FIGS. 2 and 3, an area AR of a rectangular shape indicates a fixed area of a display screen. For example, if the area AR which is formed from 5×5 pixels x11 to x55 (FIG. 2) on a display screen of the VGA according to the pixel number of 640×480 is applied to the XGA which includes the pixel number of 1,024×768 which exhibits an integral ratio of 5:8 in pixel number to the pixel number of 640×480, then the area AR is formed from 8×8 pixels y11 to y88.

Therefore, in conversion of image data according to the VGA into image data according to the XGA, the interpolation processing converts the partial image of 5×5 pixels x11 to x55 into the partial image of 8×8 pixels y11 to y88. Further, in the VGA having the pixel number of 640×480 or the XGA having the pixel number of 1,024×768, 128 such partial images each including 5×5 pixels (x11 to x55) or 8×8 pixels (y11 to y88) are disposed in the horizontal direction and 96 such partial images are disposed in the vertical direction to form one screen. Therefore, processing of converting a partial image having 5×5 pixels (x11 to x55) into another partial image according to 8×8 pixels (y11 to y88) is repeated to convert one screen of the VGA into one screen of the XGA. Further, by repeating processing reverse to that, one screen of the XGA can be converted into one screen of the VGA.

Consequently, it can be recognized that, when format conversion is performed between image data using the VGA and image data of the XGA in this manner, the format conversion in interpolation processing can be performed by repeating processing in accordance with a predetermined arrangement relationship corresponding to an integer ratio in pixel number.

FIG. 4 illustrates integer ratios in pixel number in major formats of image data for a computer. From the table of FIG. 4, it can be recognized that the relationship described above stands also among the formats.

FIG. 5 illustrates the areas AR of FIGS. 2 and 3 overlapped with each other. When the overlapping relationship of the pixels x11 to x55 of the VGA with respect to the pixels y11 to y88 of the XGA in the overlapping area AR is examined, such overlaps can be classified into six different patterns A to F as shown in FIG. 6.

The six patterns A to F are shown more particularly in FIGS. 7A to 7F, respectively. In the first pattern A shown in FIG. 7A, a pixel of the XGA overlaps such that, like the pixels y11, y13, . . . , y31, . . . , it is included fully in a corresponding original pixel like the pixel x11 of the VGA.

Figure 7A:
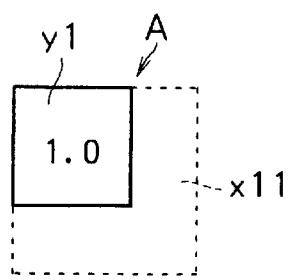
FIGS. 7A to 7F are schematic diagrammatic views showing six different patterns of the overlap of FIG. 6.
Figure 7B:
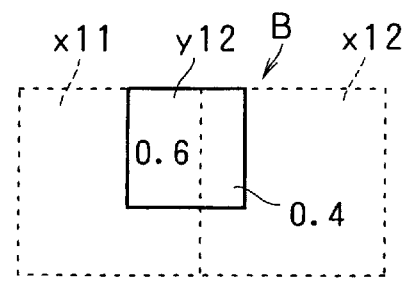

In the second pattern B shown in FIG. 7B, a pixel overlaps such that, like the pixels y12, y17, . . . , y21, . . . , it extends over two neighboring original pixels x11, x12 and the area occupied thereby is divided at an area ratio of 0.6:0.4 by the two neighboring original pixels like the pixels x11, x12.

Figure 7C:
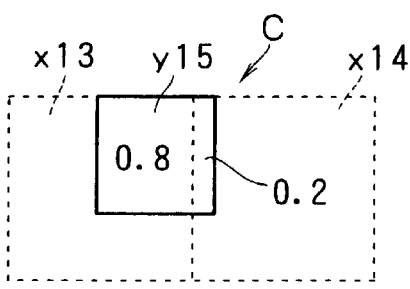

In the third pattern C shown in FIG. 7C, a pixel overlaps such that, like the pixels y14, y15, . . . , y41, . . . , it extends over two neighboring original pixels and the area occupied thereby is divided at an area ratio of 0.8:0.2 by the two neighboring original pixels.

Figure 7D:
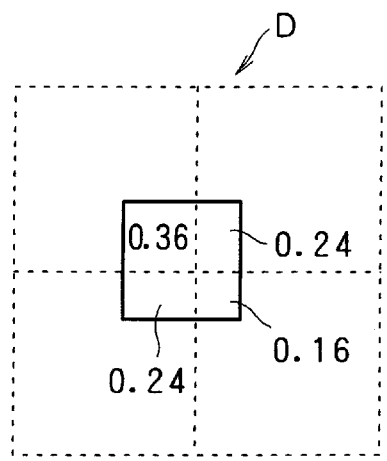

In contrast, in the fourth pattern D shown in FIG. 7D, a pixel overlaps such that, like the pixels y22, y27, . . . , y72, . . . , it extends over four neighboring original pixels and the area occupied thereby is divided at an area ratio of 0.36:0.24:0.24:0.16 by the four neighboring original pixels.

Figure 7E:
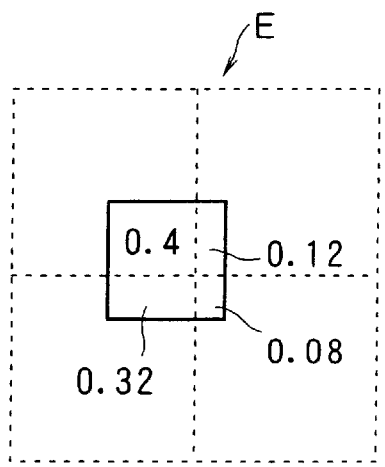

In the fifth pattern E shown in FIG. 7e, a pixel overlaps such that, like the pixels y24, y25, . . . , y42, . . . , it extends over four neighboring original pixels and the area occupied thereby is divided at an area ratio of 0.48:0.12:0.32:0.08 by the four adjacent original pixels.

Figure 7F:
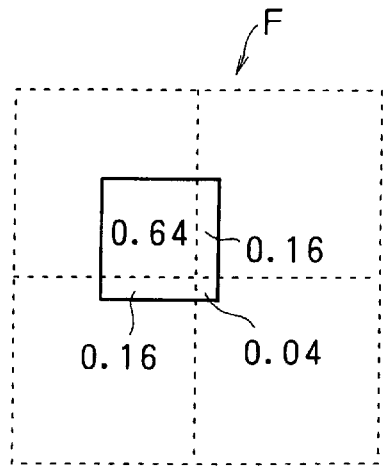

In the sixth pattern F shown in FIG. 7F, a pixel overlaps such that, like the pixels y44, y45, y54 and y55, it extends over four neighboring original pixels and the area occupied thereby is divided at an area ratio of 0.64:0.16:0.16:0.04 by the four neighboring original pixels.

The area ratio represented in this manner indicates degrees of the influence in the original pixels upon a conversion pixel. Consequently, image data of a conversion image can be produced if weighted addition is performed for image data of original pixels based on the area ratios as represented by the following expressions with regard to the conversion pixels y11, y12, y14, y22, y24 and y44 which correspond to the patterns A to F, respectively:

$$y11 = x11 \quad (6)$$

$$y12 = 0.6 \times x11 + 0.4 \times x12 \quad (7)$$

$$y14 = 0.8 \times x13 + 0.2 \times x12 \quad (8)$$

$$y22 = 0.36 \times x11 + 0.24 \times x12 + 0.24 \times x21 + 0.16 \times x22 \quad (9)$$

$$y24 = 0.48 \times x13 + 0.12 \times x12 + 0.08 \times x22 + 0.32 \times x23 \quad (10)$$

$$y44 = 0.64 \times x33 + 0.16 \times x32 + 0.04 \times x22 + 0.16 \times x23 \quad (11)$$

Conversely, when the overlaps in FIG. 5 of the pixels y11 to y88 of the XGA with respect to the pixels x11 to x55 of the VGA are examined, they can be classified into six different patterns A to F similarly as shown in DIG. 8.

The six patterns A to F are shown more particularly in FIGS. 9A to 9F. In the first pattern A shown in FIG. 9A, a pixel of the VGA overlaps such that, like the pixels x11, x15, x51, x55, it extends over four, that is, 2×2, neighboring original pixels like the pixels y11, y12, y21 and y22 and the area occupied thereby is divided at an area ratio of 0.391:0.234:0.234:0.141 by the four neighboring original pixels like the pixels y11, y12, y21 and y22.

Figure 9A:
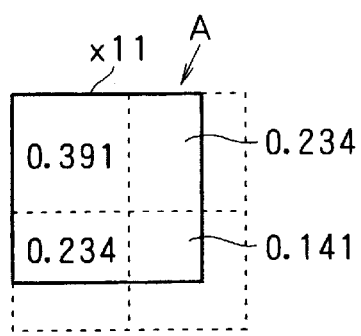
FIGS. 9A to 9F are schematic diagrammatic views showing six different patterns of the overlap of FIG. 8.
Figure 9B:
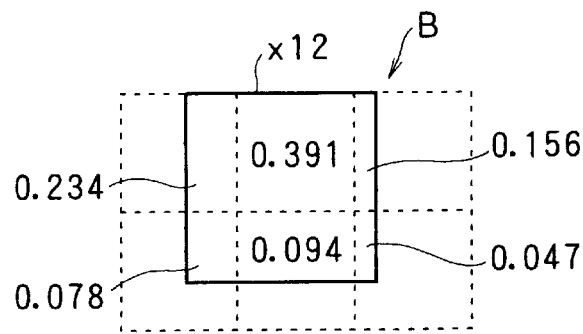

In the second pattern B shown in FIG. 9B, a pixel overlaps such that, like the pixels x12, x14, x21, x25, it extends over six, that is 3×2 or 2×3, neighboring original pixels and the area occupied thereby is divided at an area ratio of 0.234:0.391:0.156:0.078:0.094:0.047 by the six neighboring original pixels.

Figure 9C:
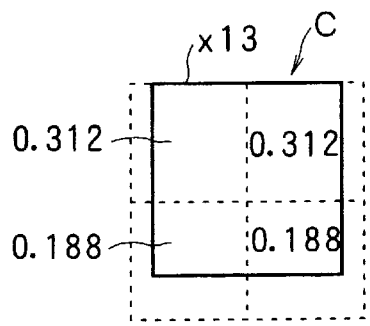

In the third pattern C shown in FIG. 9C, a pixel overlaps such that, like the pixels x13, x31, x35, x53, it extends over four, that is, 2×2, neighboring original pixels and the area occupied thereby is divided at an area ratio of 0.312:0.312:0.188:0.188 by the four neighboring original pixels.

Figure 9D:
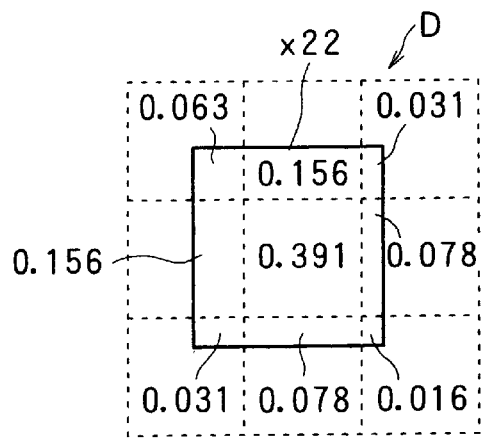

In the fourth pattern D shown in FIG. 9D, a pixel overlaps such that, like the pixels x22, x24, x42, x44, it extends over nine, that is, 3×3 neighboring original pixels and the area occupied thereby is divided at an area ratio of 0.063:0.156:0.031:0.156:0.391:0.078:0.031:0.078:0.016 by the nine neighboring original pixels.

Figure 9E:
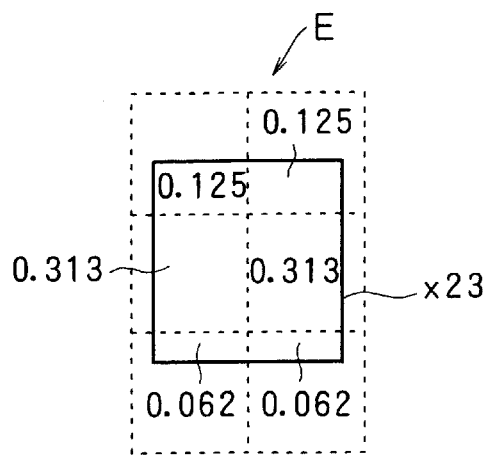

In the fifth pattern E shown in FIG. 9E, a pixel overlaps such that, like the pixels x23, x32, x34, x43, it extends over six, that is, 3×2 or 2×3, neighboring original pixels and the area occupied thereby is divided at an area ratio of 0.125:0.125:0.313:0.313:0.062:0.062 by the six neighboring original pixels.

Figure 9F:
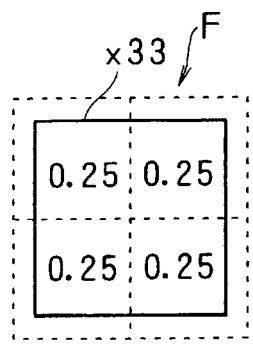

In the sixth pattern F shown in FIG. 9F, a pixel overlaps such that, like the pixel x33, it extends over four, that is, 2×2, neighboring original pixels and the area occupied thereby is divided at an area ratio of 0.25:0.25:0.25:0.25 by the four neighboring original pixels.

Also in this instance, each area ratio indicates degrees of the influence of original pixels upon a conversion pixel. Consequently, image data of a conversion image can be produced if weighted addition is performed for image data of corresponding original pixels based on the area ratios as represented by the following expressions with regard to the conversion pixels x11, x12, x13, x22, x23 and x33 which correspond to the patterns A to F, respectively.

$$x11 = 0.391 \times y11 + 0.234 \times y12 + 0.234 \times y21 + 0.141 \times y22 \quad (12)$$

$$x12 = 0.391 \times y13 + 0.234 \times y23 + 0.156 \times y12 + 0.094 \times y22 \quad (13)$$

$$x13 = 0.312 \times y14 + 0.312 \times y15 + 0.188 \times y24 + 0.188 \times y25 \quad (14)$$

$$x22 = 0.063 \times y22 + 0.156 \times y23 + 0.031 \times y24 + 0.156 \times y32 + 0.391 \times y33 + 0.078 \times y34 + 0.031 \times y42 + 0.078 \times y43 + 0.016 \times y44 \quad (15)$$

$$x23 = 0.125 \times y24 + 0.125 \times y25 + 0.313 \times y34 + 0.313 \times y35 + 0.062 \times y44 + 0.062 \times y45 \quad (16)$$

$$x33 = 0.25 \times y44 + 0.25 \times y45 + 0.25 \times y54 + 0.25 \times y55 \quad (17)$$

By the way, in the processing of weighted adding image data of original pixels in accordance with area ratios at which the original pixels overlap with neighboring pixels of the conversion image in the horizontal direction and the vertical direction in this manner, similar results to those described above can be obtained even if weighted addition processing for the horizontal direction and weighted addition processing for the vertical direction are executed successively. Therefore, in the following, processing of interpolation processing is described in connection with one-dimensional processing.

In the present embodiment, such weighted addition with reference to an area ratio as described above is expanded to define an interpolation function h(x) in accordance with the following expressions obtained by correcting the weighting coefficients based on the area ratio with a conversion ratio r.

$$h(x) = 0 \quad (-T \leq x < -t1) \quad (18)$$

$$h(x) = r(t1 + x) \quad (-t1 \leq x < -t2)$$

$$h(x) = r(t1 - t2) \quad (-t2 \leq x < t2)$$

$$h(x) = r(t1 - x) \quad (t2 \leq x < t1)$$

$$h(x) = 0 \quad (t1 \leq x < T)$$

where t1, t2 and T are represented by the following expressions using the conversion ratio r:

$$t1 = (1/r + 1)/2 \quad (19)$$

$$t2 = |1/r - 1|/2 \quad (20)$$

$$T = \text{int}[t1] \quad (21)$$

where int[a] is the smallest integer greater than a, and T indicates a range within which the value of the interpolation function is present. Here, for example, in conversion of an image of the XGA including 1,024 pixels in the horizontal direction to an image of the VGA including 640 pixels in the horizontal direction, T=1 is obtained by setting t1=13/16 from the expression (19). In this instance, the range of the value of the interpolation function is −1≤x<1, and consequently, the tap number is 2. Further, the conversion ratio r is represented, using the pixel number M of original pixels and the pixel number L of conversion pixels, as r=L/M. Consequently, where r>1, the processing is enlargement processing for increasing the number of pixels, but where r<1, the processing is reduction processing for reducing the number of pixels, and where r=1, the processing is for equal magnification processing which does not involve a variation in pixel number.

In the present invention, by defining the in interpolation function h(x) such that the weighting coefficients based on an area ratio are corrected with the conversion ratio r in this manner, the tap coefficient is corrected in accordance with the degree of enlargement or reduction to prevent deterioration in picture quality arising from the conversion ratio.

Figure 10:
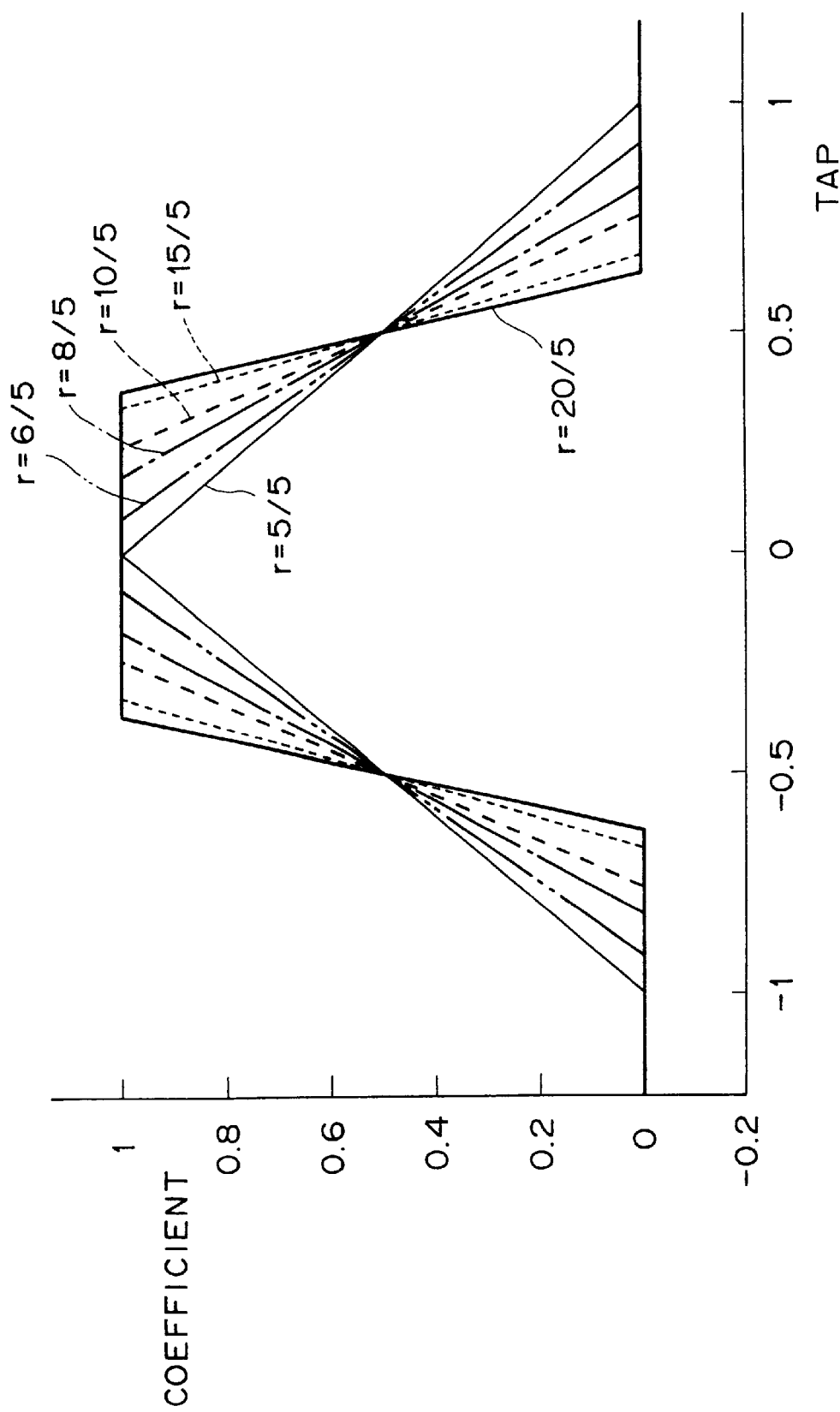
FIG. 10 is a characteristic diagram illustrating an interpolation function for enlargement.

FIG. 10 is a characteristic diagram illustrating the interpolation function h(x) in the enlargement processing where r>1. In this instance, it can be recognized that the shape of the filter varies depending upon the conversion ratio r. Incidentally, where r=1, the characteristic is the same as that of the bilinear approximation interpolation, but where r=∞, the characteristic is the same as that of the most neighborhood approximation interpolation. It is to be noted that the number of taps of the interpolation filter in this instance is 2 in the maximum.

Figure 11:
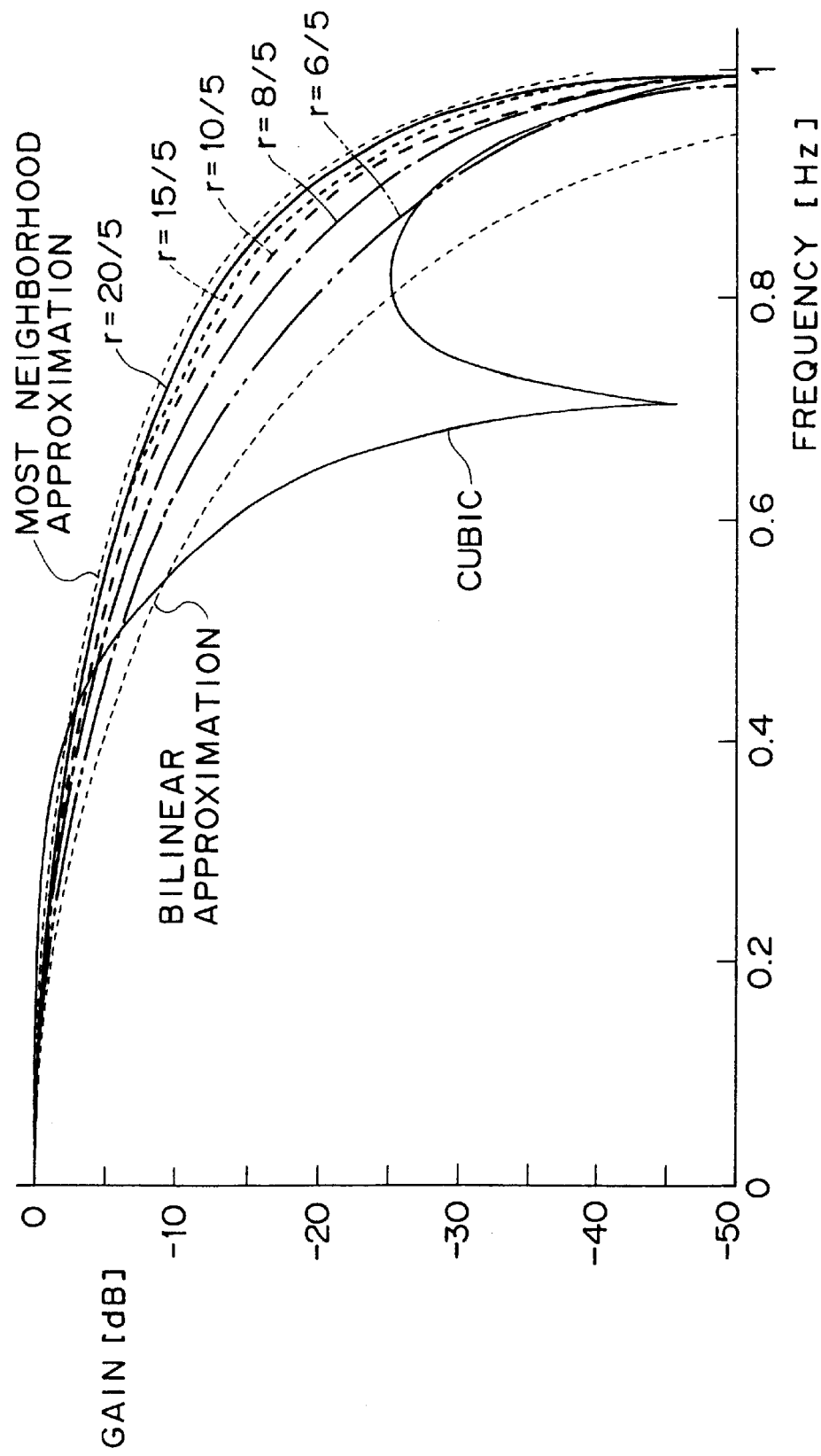
FIG. 11 is a schematic characteristic diagram illustrating a frequency characteristic of a filter according to the interpolation function of FIG. 10.

FIG. 11 is a characteristic diagram illustrating frequency characteristics at different conversion ratios in contrast to FIG. 10. In FIG. 11, frequency characteristics by the most neighborhood approximation, bilinear approximation and Cubic approximation are illustrated together for reference.

From FIG. 11, it can be seen that the characteristics are variations of the frequency characteristic by the most neighborhood approximation with respect to the conversion ratio. Therefore, it can be recognized that the pixel number can be converted without losing image information of neighboring pixels by correcting weighting coefficients produced in accordance with the area ratio. Consequently, such deterioration in picture quality that, for example, the thickness of an oblique line exhibits variations or a line itself is lost depending upon the conversion ratio as in the most neighborhood approximation can be prevented, and particularly where the present invention is applied to processing of computer images in which many such line segments are included, deterioration in picture quality can be prevented effectively.

Further, fading which becomes conspicuous when the conversion ratio increases as in the Cubic approximation or the bilinear approximation can be reduced, and deterioration in picture quality can be prevented as much.

Figure 12:
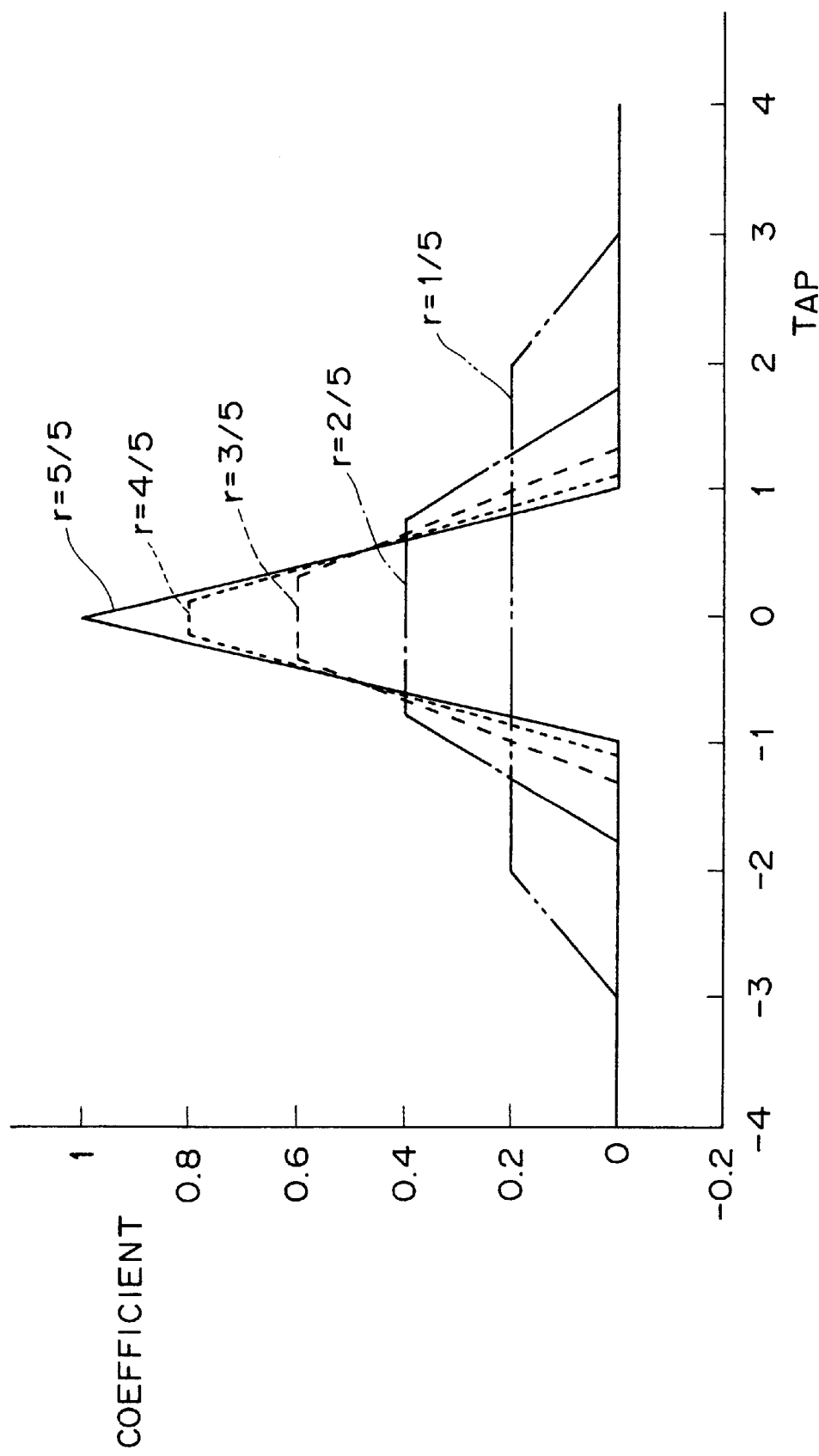
FIG. 12 is a characteristic diagram illustrating an interpolation function for reduction.

FIG. 12 is a characteristic diagram illustrating the interpolation function h(x) in reduction processing where r<1 conversely to that described above. In this instance, the shape of the filter changes and also the number of taps changes depending upon the conversion ratio r. Consequently, the pixel number can be converted without losing image information of neighboring pixels.

Figure 13:
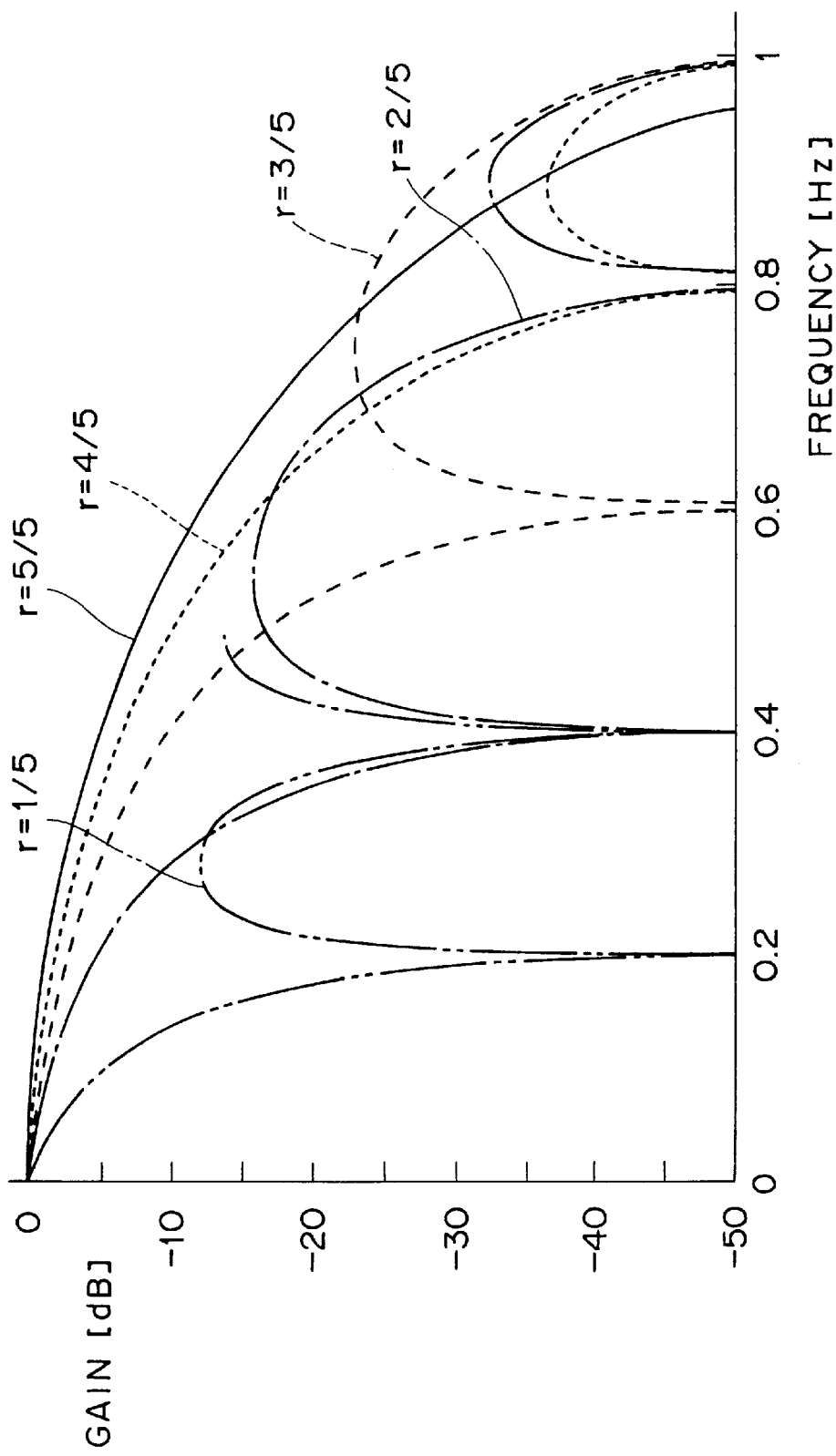
FIG. 13 is a characteristic diagram illustrating a frequency characteristic of a filter according to the interpolation function of FIG. 12.

FIG. 13 is a characteristic diagram illustrating frequency characteristics at different conversion ratios in contrast to FIG. 12. In this instance, it can be recognized that the frequency characteristic varies in response to the conversion ratio r, and particularly as the conversion ratio r decreases, the pass characteristic in a high frequency band is suppressed as much and consequently the characteristics have a property that foldover distortion is eliminated. Accordingly, it can be recognized that, according to the present invention, a pre-low-pass filter required in a conventional interpolation filter can be omitted.

2. First Embodiment
2-1. Construction of the First Embodiment

Figure 14:
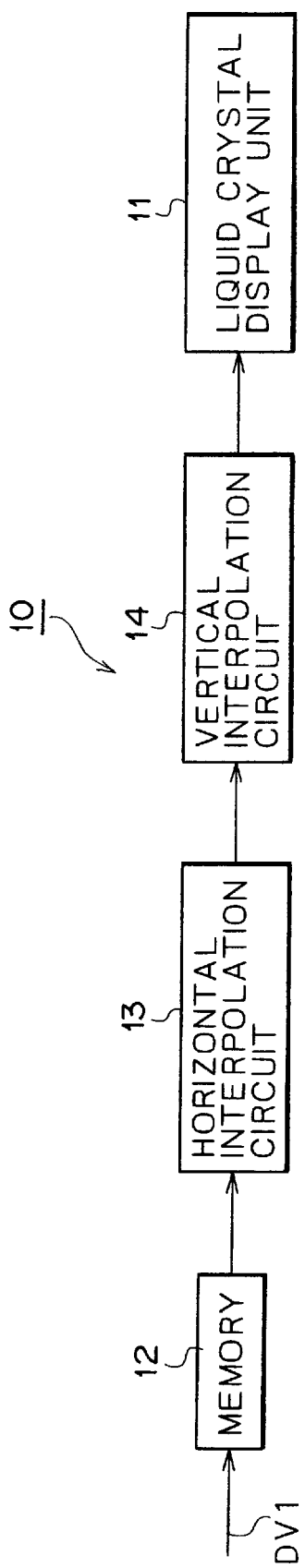
FIG. 14 is a block diagram showing the personal computer according to the first embodiment of the present invention.

FIG. 14 is a block diagram showing a construction of part of a personal computer according to a first embodiment of the present invention. Referring to FIG. 14, in the personal computer of the present embodiment, for example, an image downloaded from the Internet or the like is displayed on a liquid crystal display unit 11. In this instance, the personal computer 10 enlarges or reduces image data of a predetermined pixel number in response to an operation of a user so that an image of a size desired by the user is displayed on the liquid crystal display unit 11.

To this end, a memory 12 in the personal computer 10 stores and holds image data DV1 to be used for the display, and a horizontal interpolation circuit 13 converts the pixel number of the image data held in the memory 12 in regard to the horizontal direction and outputs resulting image data. A vertical interpolation circuit 14 converts the pixel number of the image data outputted from the horizontal interpolation circuit 13 in regard to the vertical direction and outputs resulting image data.

Figure 1:
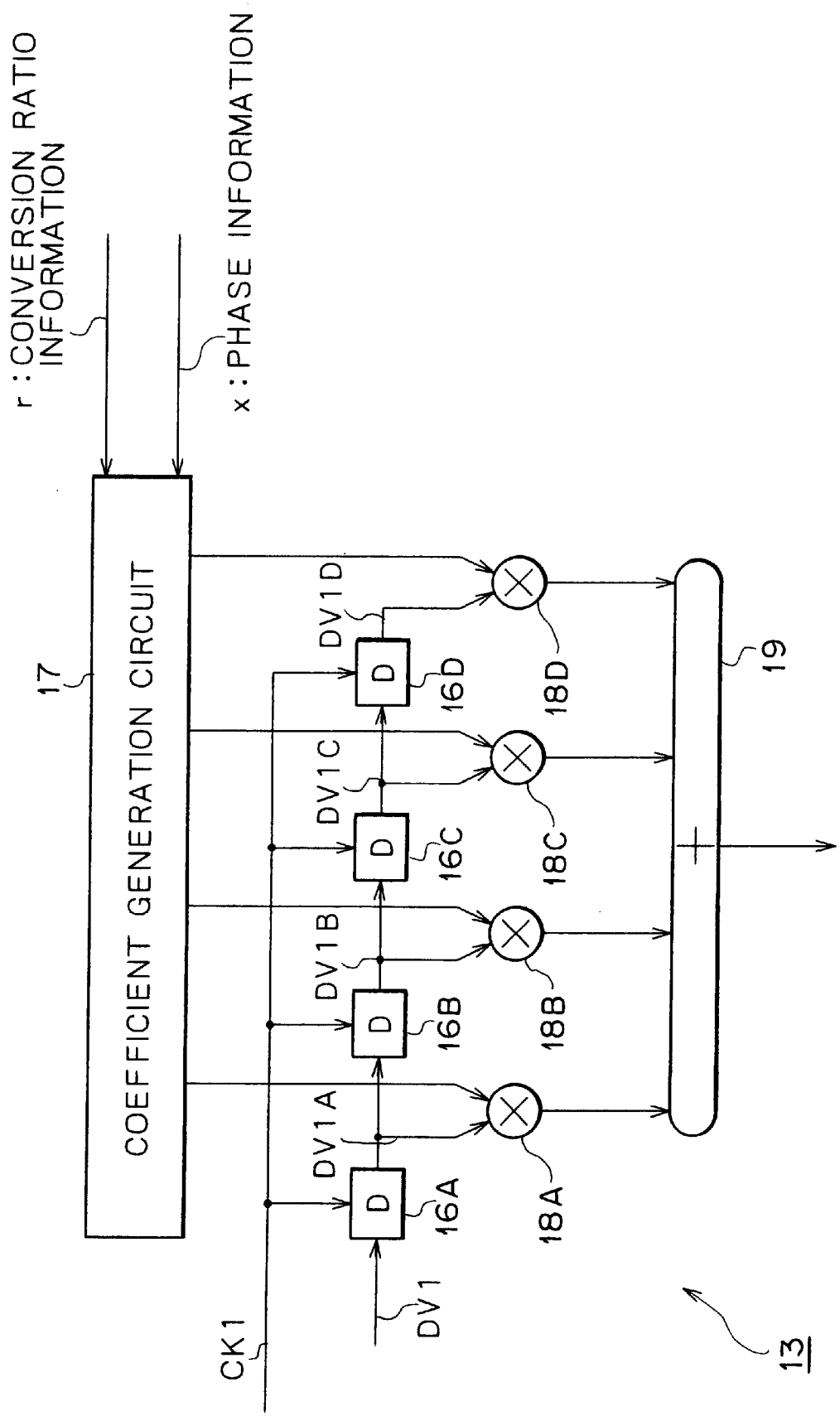
FIG. 1 is a block diagram showing an interpolation circuit for a horizontal direction applied to a personal computer according to a first embodiment of the present invention.

FIG. 1 shows a detailed construction of the horizontal interpolation circuit 13 mentioned above. It is to be noted that the vertical interpolation circuit 14 has the same construction as that of the horizontal interpolation circuit 13 except that the delay times of delay circuits therein and processing timings corresponding to the delay times are different. Therefore, overlapping description of the construction of the vertical interpolation circuit 14 is omitted herein to avoid redundancy.

Referring to FIG. 1, delay circuits 16A to 16D in the horizontal interpolation circuit 13 operate with reference to a clock signal CK1 synchronized with the image data DV1 and are connected in series to each other to form a shift register. The delay circuits 16A to 16D successively transfer the image data DV1 of an original image and outputs image data DV1A to DV1D of four samples of the original image which neighbor each other in the horizontal direction.

A coefficient generation circuit 17 successively produces weighting coefficients for weighting the image data DV1A to DV1D of four samples based on phase information p which is a result of phase comparison between the clock signal CK1 synchronized with the original pixels and a predetermined clock signal and conversion ratio information r and outputs the weighting coefficients to multiplication circuits 18A to 18D. In the process of production of the weighting coefficients, the coefficient generation circuit 17 switches the processing of coefficient production when the processing for enlargement and the processing for reduction based on the conversion ratio information r.

It is to be noted that, in the following description, as the values of M and L, integer values obtained by dividing the pixel number of original pixels and the pixel number of conversion pixels by the greatest common devisor are preferably used in place of the pixel number of original pixels and the pixel number of conversion pixels described above, respectively. Accordingly, for example, when the VGA screen having 640×480 pixels is to be enlarged to the XGA screen having 1,024×768 pixels, M=5 and L=8, and consequently, the conversion ratio r is 8/5. Further, in actual operation processing, it is required that operation expressions of integer operation which are as simple and easy as possible be used in order to achieve high speed processing, a high operation efficiency and so forth. Thus, in place of the phase x normalized with the pixel interval used in the foregoing description, a phase p having a corresponding relationship given by the following expression (22) to the phase x is used to produce weighting coefficients.

$$p = Lx + (1/2)(3L - M) \quad (22)$$

In processing for enlargement, the coefficient generation circuit 17 produces weighting coefficients using an interpolation function of the following expressions (23) obtained by substituting the expression (22) above into the expressions (18) given hereinabove:

$$h(p) = 0 \quad (0 \leq p < L-M) \quad (23)$$
$$h(p) = \{p - (L-M)\}/M \quad (L-M \leq p < L)$$
$$h(p) = 1 \quad (L \leq p < T-M)$$
$$h(p) = (T-p)/M \quad (T-M \leq p < T)$$

$$T = 2 \times L \quad (24)$$

It is to be noted that, since the lower limit to the range applied to the first relational expression of the expressions (23) in processing for enlargement is L−M>0, the lower limit value−T indicated with regard to the first relational expression of the expressions (18) is replaced by the value 0 to raise the efficiency in operation. On the other hand, in processing for enlargement, since the tap number is 2 in the maximum, the fifth relational expression of the expressions (18) handles a value of the phase p which cannot be assumed actually, and therefore is not brought out of application.

Consequently, the coefficient generation circuit 17 receives the phase information p in the form of an integral value and produces coefficients. It is to be noted that T in the expression (24) is a sample number of the entire interpolation function, and the interpolation tap number in each phase is represented by T/L. Since the tap number in processing for enlargement is 2 in the maximum, the coefficient generation circuit 17 outputs the coefficients of the value 0 to the multiplication circuits 18A and 18D.

In contrast, in the processing for reduction, for the convenience of operation processing, the phase p having a corresponding relationship given by the following expression (25) to the phase x is used to produce weighting coefficients similarly as described above.

$$p = Lx + (1/2)(L+M) \quad (25)$$

The coefficient generation circuit 17 produces weighting coefficients using an interpolation function of the following expressions (26) obtained by substituting the expression (25) into the expressions (18) similarly as in processing for enlargement.

$$h(p) = P/M \quad (0 \leq p < L) \quad (26)$$
$$h(p) = L/M \quad (L \leq p < M)$$
$$h(p) = \{(L+M) - p\}/M \quad (M \leq p < L+M)$$
$$h(p) = 0 \quad (L+M \leq p < T)$$

$$T = (int[M/L] + 2) \times L \quad (27)$$

It is to be noted that, since, from the expression (26), the tap number is 3 where the conversion ratio r ranges from 1 to 1/2, 4 where the conversion ratio r ranges from 1/2 to 1/3 and 5 where the conversion ratio r ranges from 1/3 to 1/4, reduction processing for the conversion ratio r up to 1/3 in the maximum is executed in the present embodiment.

The multiplication circuits 18A to 18D multiply image data by the corresponding weighting coefficients and outputs resulting data, and an addition circuit 19 adds weighting results of the multiplication circuits 18A to 18D and outputs resulting data.

2-2. Operation of the First Embodiment

In the personal computer 10 (FIG. 14) having the construction described above, image data DV1 obtained from various sources are stored once into the memory 12 and then supplied through the horizontal interpolation circuit 13 and the vertical interpolation circuit 14 to the liquid crystal display unit 11, thereby an image based on the image data DV1 is provided to the user.

In this instance, for example, if an instruction to display the image based on the image data DV1 which has been displayed at part of a display screen, in an enlarged size is inputted by an operation of the user, or conversely if an instruction to display an image based on the image data DV1 which has been displayed on the overall area of the display screen in a reduced size is inputted, or otherwise when the format of the image data DV1 provided from the memory 12 is different from a format which is to be used for displaying on the liquid crystal display unit 11, the horizontal interpolation circuit 13 converts the pixel number in the horizontal direction and then the vertical interpolation circuit 14 converts the pixel number in the vertical direction. Consequently, image data for an image of a size desired by the user or image data by the format of the liquid crystal display unit 11 are inputted to the liquid crystal display unit 11.

In the conversion processing of the pixel number in the horizontal direction (FIG. 1), image data of four pixels successive in the horizontal direction are successively selected from the image data DV1 by the delay circuits 16A to 16D, and the image data of the four pixels are weighted added with weighting coefficients outputted from the coefficient generation circuit 17 based on enlargement/reduction in the horizontal direction or the ratio in pixel number conversion. Consequently, image data of an object pixel number in the horizontal direction are successively produced from the image data DV1.

Further, in the conversion processing of the pixel number in the vertical direction, image data of four pixels successive in the vertical direction are successively selected from the image data whose pixel number in the horizontal direction has been converted, and the image data of the four pixels are weighted added with weighting coefficients outputted from the coefficient generation circuit 17 based on enlargement/reduction in the vertical direction or the ratio in pixel number conversion similarly to produce image data by an object pixel number.

In the processing described above, the weighting coefficients are produced in accordance with the operation expressions (23) and (26) such that they may correspond to an area ratio at which, when an image according to input image data is overlapped with an image according to output image data and an area occupied by one pixel of the output image data is viewed in this state, the area is divided by pixels in the horizontal and vertical directions of the input image data correspond to the one pixel.

As a result of the processing, the personal computer 10 can obtain the same result as is obtained when it weighted adds based on the phases in the horizontal and vertical directions of object image data with respect to the image data DV1 so that the area occupied by the object image data may correspond to an area ratio at which the area is divided two-dimensionally by the corresponding image data DV1 (FIGS. 6 to 9).

Consequently, in the processing for enlargement of increasing the pixel number, by weighted adding image data of four successive pixels in the horizontal direction and the vertical direction, image data can be produced successively with a characteristic obtained by varying the frequency characteristic according to the most neighborhood approximation in response to a variation ratio (FIGS. 10 and 11), and the pixel number can be converted without losing image information of the neighboring pixels.

Consequently, in the present embodiment, such deterioration in picture quality that, for example, the thickness of an oblique line exhibits variations or a line itself is lost depending upon the conversion ratio as in the most approximation can be prevented, and particularly where the present invention is applied to processing of computer images in which many such line segments are included, deterioration in picture quality can be prevented effectively.

Further, fading which becomes conspicuous when the conversion ratio increases as in the Cubic approximation or the bilinear approximation can be reduced, and deterioration in picture quality can be prevented as much.

On the other hand, in the processing for reduction of decreasing the pixel number, by weighted adding image data of a pixel number in accordance with a conversion ratio in the horizontal direction and the vertical direction, image data can be successively produced in accordance with a frequency characteristic according to the conversion ratio (FIGS. 12 and 13). Also in this instance, the pixel number can be converted without losing image information of the neighboring pixels.

In this instance, in the present embodiment, as the conversion ratio r decreases, the pass characteristic in a high frequency band is suppressed as much, and consequently, production of foldover distortion can be prevented even if a pre-low-pass filter is omitted and the overall construction can be simplified as much by the omission of the pre-low-pass filter.

Further, by successively producing weighting coefficients in accordance with the interpolation operation expressions of (23) and (26) in response to phase information and conversion ratio information and performing weighted addition with the weighting coefficients to successively convert the pixel number, universality can be provided to the conversion ratio with a simple construction, and even if the conversion ratio is varied to various values by converting the pixel number on the real time basis, deterioration in picture quality can be prevented.

2-3. Effects of the First Embodiment

With the present embodiment having the construction described above, since weighting coefficients are produced such that an area occupied by object image data may correspond to an area ratio at which it is divided by the corresponding image data DV1 based on phase information and weighting coefficients corresponding to the area ratio may be corrected with a conversion ratio which is a ratio in pixel number and interpolation operation processing is performed using the weighting coefficients, it is possible to convert the pixel number with various conversion ratios to prevent deterioration in picture quality arising from the conversion ratio.

3. Second Embodiment

Figure 15:
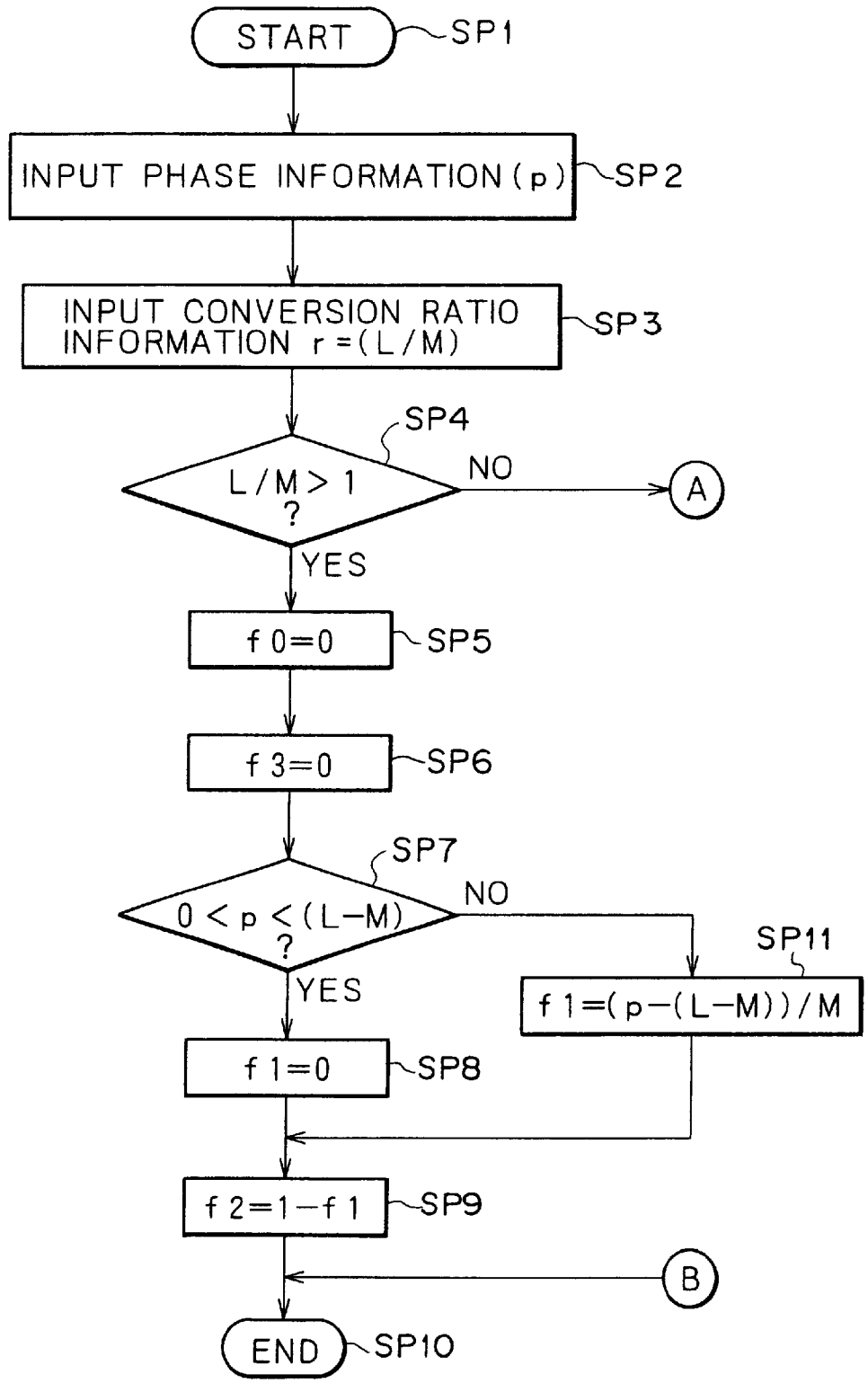
FIGS. 15 and 16 are flow charts illustrating a processing procedure of an image processing apparatus according to a second embodiment of the present invention.
Figure 16:
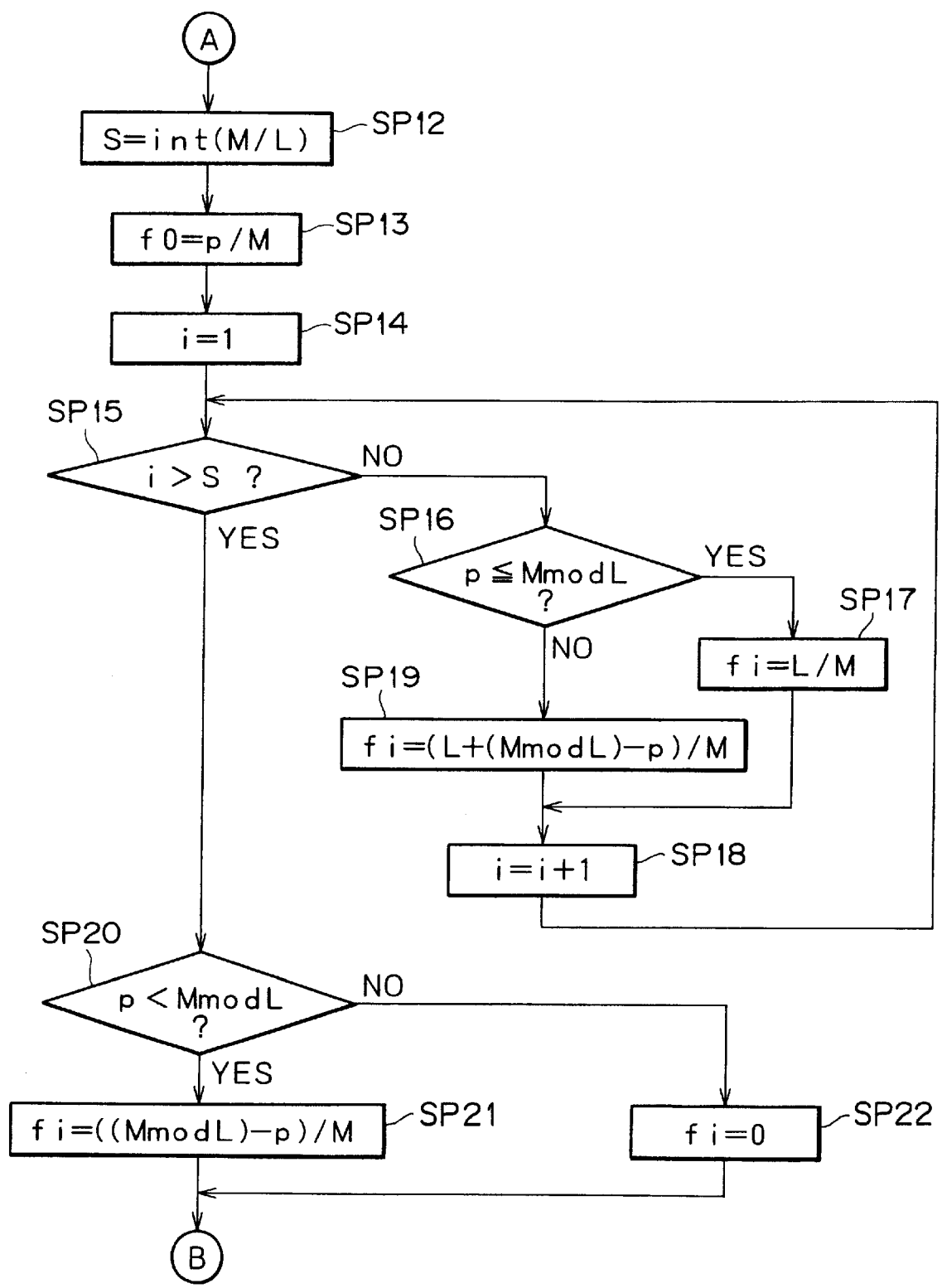
Figure 17:
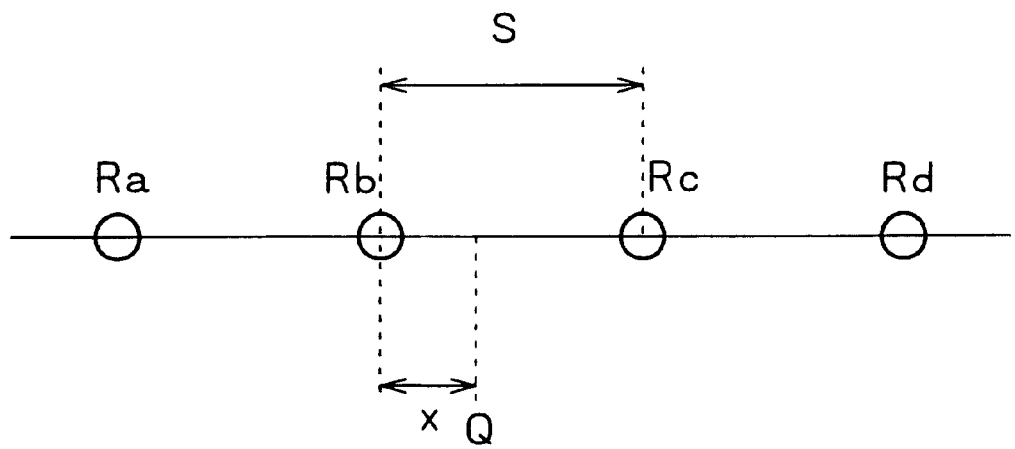
FIG. 17 is a schematic diagrammatic view illustrating processing of image data by interpolation operation processing.
Figure 18:
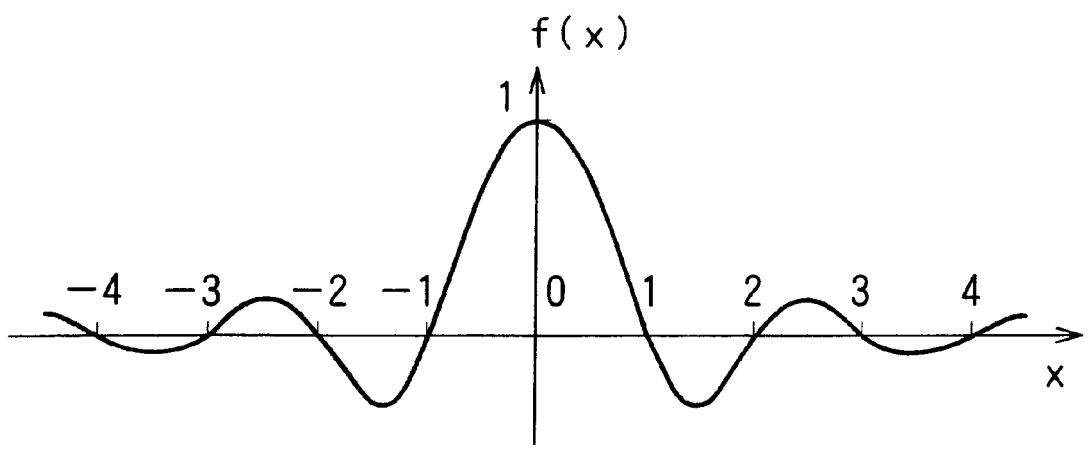
FIG. 18 is a characteristic diagram illustrating a sinc function.
Figure 19:
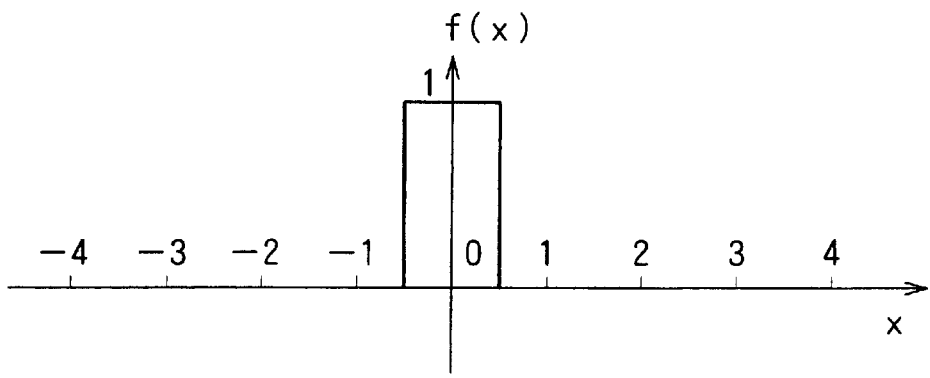
FIG. 19 is a characteristic diagram illustrating the most neighborhood approximation.
Figure 20:
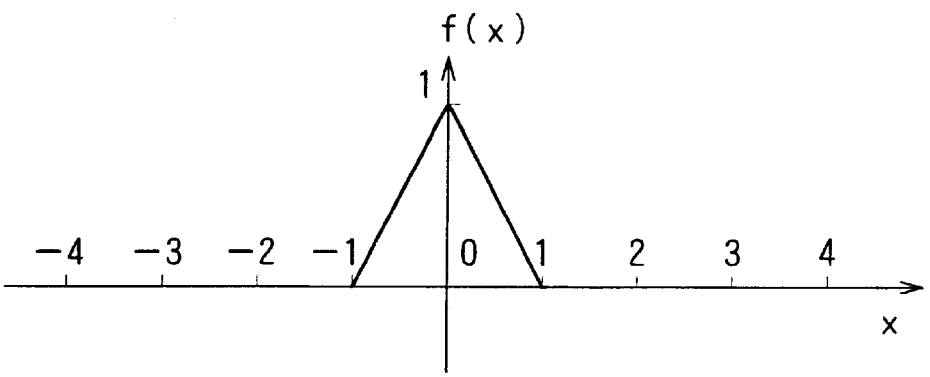
FIG. 20 is a characteristic diagram illustrating the bilinear approximation.
Figure 21:
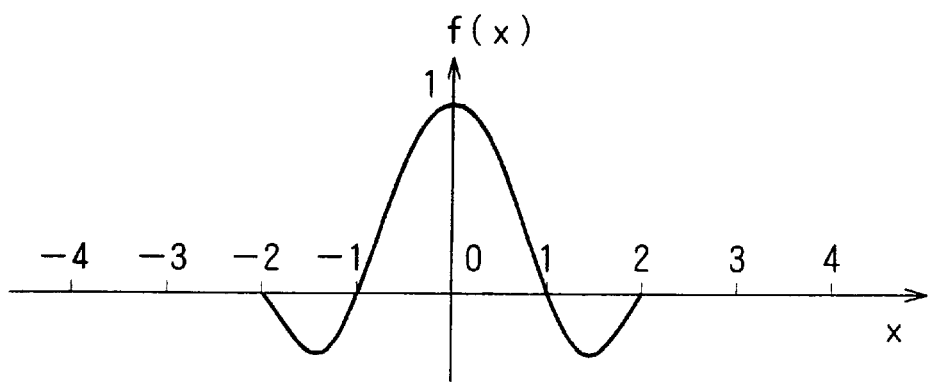
FIG. 21 is a characteristic diagram illustrating the Cubic approximation.
Figure 22:
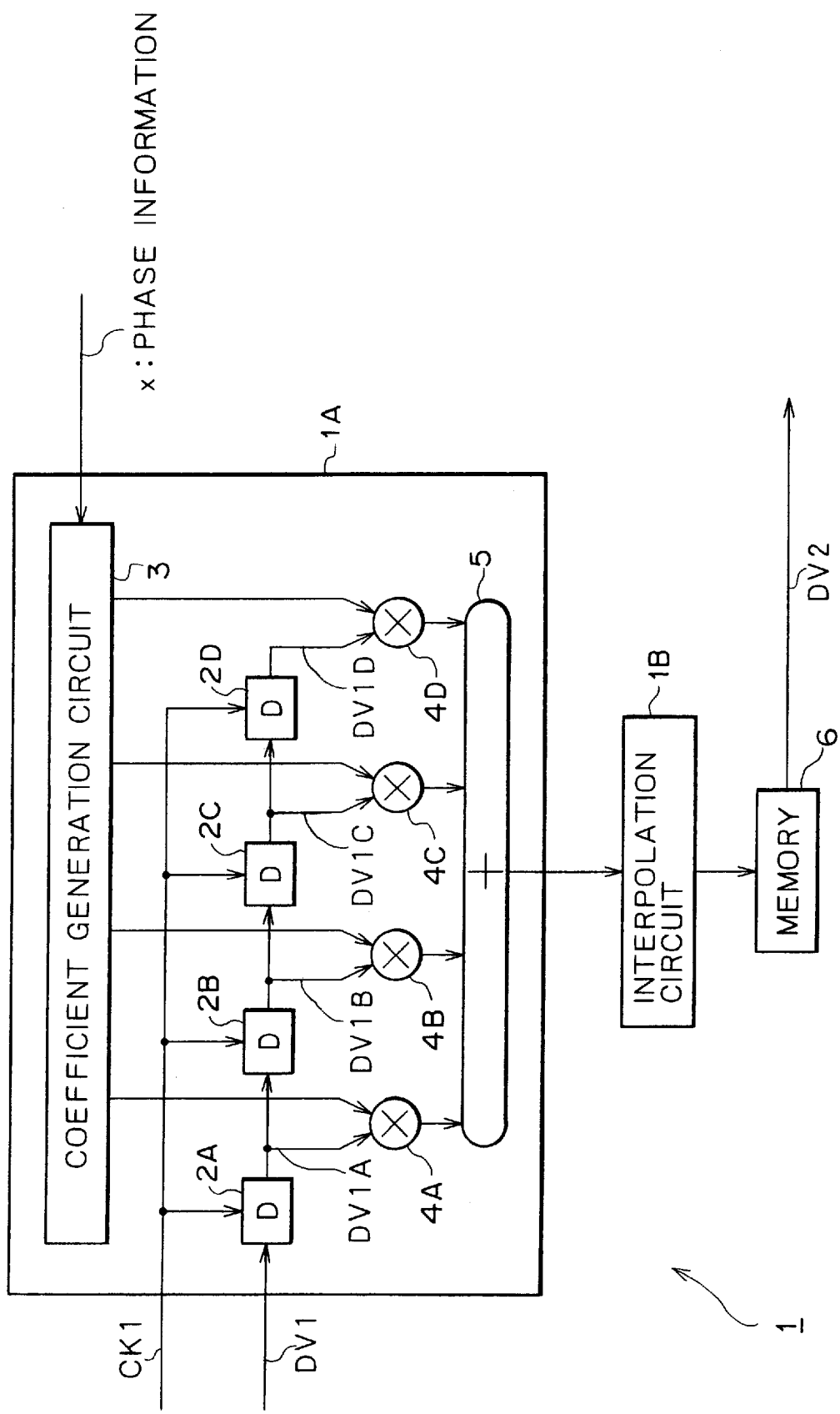
FIG. 22 is a block diagram showing an interpolation apparatus which employs the Cubic approximation.

FIGS. 15 and 16 are flow charts illustrating a processing procedure of an image processing apparatus. In the present image processing apparatus, image data successively inputted to a built-in memory are temporarily stored and the processing procedure illustrated in FIGS. 15 and 16 is repeated in a sampling period for object image data to successively produce weighting coefficients, and a pixel number of the image data successively inputted is converted with the weighting coefficients and resulting data are outputted.

Referring first to FIG. 15, the image processing apparatus starts its processing at step SP1 and advances its control to step SP2, in which it acquires phase information p. Further, the image processing apparatus advances the control to step SP3, in which it acquires conversion ratio information r=L/M. It is to be noted that the information here is calculated in accordance with a setting of the user in an application program in a higher order than the processing procedure and passed to the present processing procedure.

Then, the image processing apparatus advances the control to step SP4, in which it discriminates whether or not the conversion ratio r (L/M) is higher than 1 to discriminate whether the conversion processing for the pixel number is processing for enlargement or processing for reduction. If the conversion processing for the pixel number is processing for enlargement in step SP4, then the information processing apparatus advances the control to step SP5, in which the weighting coefficient f0 to be outputted to the first tap is set to the value 0.

Thereafter, the image processing apparatus advances the control to step SP6, in which it sets the weighting coefficient f3 to be outputted to the fourth tap to the value 0, and then advances the control to step SP7. In step SP7, the image processing apparatus discriminates whether or not the phase information p is within a range from the value 0 to the value L−M. If an affirmative result is obtained in step SP7, then the image processing apparatus advances the control to step SP8, in which it sets the weighting coefficient f1 to be outputted to the second tap to the value 0. Further, the image processing apparatus advances the control to step SP9, in which it places a value 1−f1 obtained by subtracting the weighting coefficient f1 to be outputted to the second tap from 1 into the weighting coefficient f2 to be outputted to the third tap, whereafter the image processing apparatus advances the control to step SP10, it ends the processing procedure.

By the processing, when the phase information p is within the range from the value 0 to the value L−M, the image processing apparatus sets the coefficients for the taps to 0.0, 0.0, 1.0, 0.0. Consequently, weighting coefficients are produced so that they may correspond to the most neighborhood approximation in this instance.

On the other hand, when the phase information p is not present within the range from the value 0 to the value L−M, a negative result is obtained in step SP7, and consequently, the image processing apparatus advances the control from step SP7 to step SP11. In step SP11, the image processing apparatus sets the weighting coefficient f1 to be outputted to the second tap to the value (p−(L−M))/M. Then, the image processing apparatus advances the control to step SP9, in which it places the value 1−f1 obtained by subtracting the weighting coefficient f1 set in this manner from 1 into the weighting coefficient f2 to be outputted to the third tap, whereafter it advances the control to step SP10, in which it ends the processing procedure.

Consequently, when the phase information p is not present within the range from the value 0 to the value L−M, the image processing apparatus sets the coefficients for the taps to 0.0, (p−(L−M))/M, 1−(p−(L−M))/M, 0.0 thereby. Consequently, weighting coefficients are produced by interpolation processing similar to the bilinear approximation rather than the most neighborhood approximation.

In contrast, when the conversion processing for the pixel number is processing for reduction, the image processing apparatus advances the control from step SP4 to step SP12 (FIG. 16). Referring now to FIG. 16, the image processing apparatus calculates, in step SP12, a variable S which defines the tap number T to calculate a tap number. It is to be noted that the tap number T is calculated from the variable S in accordance with S+2.

Then, the image processing apparatus advances the control to step SP13, in which it sets the weighting coefficient f0 to be outputted to the first tap to p/M, and then to step SP14, in which it sets a variable i which indicates the number of a tap to 1.

Then, the image processing apparatus advances the control to step SP15, in which it discriminates whether or not the variable i is higher then the value of the variable S to discriminate whether or not calculation for weighting coefficients for a number of taps smaller by the value 1 than the tap number calculated in step SP12 is completed. In this instance, since a negative result is obtained, the image processing apparatus advances the control to step SP16.

In step SP16, the image processing apparatus discriminates whether or not a remainder MmodL obtained by dividing the pixel number M of the original image by the pixel number L of the conversion image is equal to or larger than the phase information p regarding the tap designated by the variable i. If an affirmative result is obtained in step SP16, then the image processing apparatus advances the control to step SP17, in which it sets the weighting coefficient f1 to be outputted to the tap designated by the variable i to the value L/M, and then to step SP18, in which it increments the variable i by one.

Conversely if a negative result is obtained in step SP16, then the image processing apparatus advances the control to step SP19, in which it sets the weighting coefficient fi to be outputted to the tap designated by the variable i to the value (L+(MmodL)−p)/M. Further, the image processing apparatus advances the control to step SP18, in which it increments the variable i by one, whereafter it returns the control to step SP15.

Consequently, the information processing apparatus repeats the processing procedure of steps SP15–SP16–SP17–SP18–SP15 or the processing procedure of steps SP15–SP16–SP19–SP18–SP15 by a number of times equal to the tap number calculated initially, and if the last tap is reached, then an affirmative result is obtained in step SP15. Consequently, the image processing apparatus advances the control from step SP15 to step SP20.

In step SP20, the image processing apparatus discriminates whether or not the remainder MmodL obtained by dividing the pixel number M of the original image by the pixel number L of the conversion image is greater than the phase information p regarding the tap designated by the variable i. If an affirmative result is obtained in step SP20, then the image processing apparatus sets the weighting coefficient fi to be outputted to the last tap designated by the variable i to the value ((MmodL)−p)/M, whereafter it advances the control to step SP10, in which it ends the processing procedure.

On the other hand, if a negative result is obtained in step SP20, then the image processing apparatus advances the control to step SP22, in which it sets the weighting coefficient fi to be outputted to the last tap designated by the variable i to the value 0, whereafter it advances the control to step SP10, in which it ends the processing procedure.

Also where interpolation operation processing by arithmetic processing is employed as in the present embodiment, by varying weighting coefficients based on the phase information p with respect to the image data of the original pixels and the conversion ratio, effects similar to those of the first embodiment can be obtained.

4. Other Forms

It is to be noted that, while, in the embodiments described above, a case where the present invention is applied to a personal computer wherein an image is displayed on a liquid crystal display apparatus, the present invention is not limited to this and may be applied, for example, to an image display apparatus having interpolation means such that weighting coefficients to be used in weighted addition are varied based on the phase of output image data with respect to input image data and the ratio of the pixel number of the output image data with respect to the pixel number of the input image data to convert the pixel number of the input image data and the resulting output image data are outputted to a display screen.

Further, in addition to the pixel number conversion in format, image data allocated to a predetermined area of the display screen may be processed as input image data by the interpolation means so that the image in the predetermined area may be displayed in an enlarged or reduced scale.

Further, in the embodiments described above, an image is displayed on a liquid crystal display apparatus, while the present invention is not limited to this and can be applied widely to a display apparatus of fixed pixels such as a direct vision display apparatus represented by a plasma display panel (PDP) or a light emitting diode (LED) display apparatus or a projection display apparatus which employs a liquid crystal device (LCD) or a digital micromirror device (DMD) as a spatial modulation device.

Further, in the embodiments described above, while the ratios between the input pixel number and the output pixel number in the horizontal direction and the vertical direction are equal to each other, the present invention is not limited to this and can be applied widely also where the ratios in pixel number in the horizontal direction and the vertical direction are different from each other as in, for example, conversion from SXGA image data to XGA image data illustrated in FIG. 4.

Furthermore, in the embodiments described above, while weighting coefficients are calculated by a single a operation process based on the area ratio based on phase information and the conversion ratio, the present invention is not limited to this, and weighting coefficients may be calculated based on an area ratio based on phase information, whereafter they are corrected based on the conversion ratio to effect weighting calculation.

Further, in the embodiments described above, while an image is enlarged or reduced by conversion of the pixel number, the present invention is not limited to this and can be widely applied also to another case wherein the sampling frequency is converted, a further case wherein the frame frequency is converted, and so forth.

Furthermore, in the embodiments described above, while image data is corrected with a conversion ratio when they are processed by interpolation operation with reference to an area ratio, the present invention is not limited to this and can be widely applied also to a case wherein, for example, weighting coefficients calculated in accordance with the Cubic approximation are corrected with a conversion ratio and so forth.

Further, in the embodiments described above, while image data is processed, the present invention is not limited to this and can be widely applied also a case wherein audio data is processed and so forth.

While preferred embodiments of the present invention have been described using specific terms, such description is for illustrative purposes only, and it is to be understood that changes and variations may be made without departing from the spirit or scope of the following claims.

What is claimed is:

1. An interpolation/decimation apparatus, comprising:
   interpolation/decimation means for generating a plurality of output data samples from a plurality of input data samples, each output data sample being generated by applying weighting coefficients to a subset of said input data samples such that for each said output data sample each of said input data samples of said subset is multiplied by a corresponding weighting coefficient and the resulting products are added together to generate said output data sample; and weighting coefficient generation means for generating said weighting coefficients based on phase information of said output data samples with respect to said input data samples and a ratio of the number of input data samples to the number of output data samples.

2. An interpolation/decimation apparatus according to claim 1, wherein said weighting coefficient generation means generates said weighting coefficients by an operation determined according to said ratio.

3. An interpolation/decimation apparatus according to claim 1, wherein the size of said subset is determined according to said ratio.

4. An interpolation/decimation apparatus according to claim 1, wherein said weighting coefficient generation means generates said weighting coefficients by an operation determined according to whether or not said phase information is within a range that is determined according to said ratio.

5. An interpolation/decimation apparatus according to claim 1, wherein said input data samples and said output data samples are pixel values and said ratio is a ratio of a number of input pixels to a number of output pixels.

6. An interpolation/decimation apparatus according to claim 5, wherein said interpolation/decimation means executes a pixel interpolation or decimation in both horizontal and vertical directions relative to an image.

7. An interpolation/decimation apparatus according to claim 5, wherein said ratio is a ratio of the area corresponding to a pixel in an input image to the area corresponding to a pixel in an output image.

8. An interpolation/decimation method, comprising the steps of:

generating a plurality of output data samples from a plurality of input data samples, each output data sample being generated by applying weighting coefficients to a subset of said input data samples such that for each said output data sample each of said input data samples of said subset is multiplied by a corresponding weighting coefficient and the resulting products are added together to generate said output data sample; and generating said weighting coefficients based on phase information of said output data samples with respect to said input data samples and a ratio of the number of input data samples to the number of output data samples.

9. An interpolation/decimation method according to claim 8, wherein said weighting coefficients are generated by an operation determined according to said ratio.

10. An interpolation/decimation method according to claim 8, wherein the size of said subset is determined according to said ratio.

11. An interpolation/decimation method according to claim 8, wherein said weighting coefficients are generated by an operation determined according to whether or not said phase information is within a range that is determined according to said ratio.

12. An interpolation/decimation method according to claim 8, wherein said input data samples and said output data samples are pixel values and said ratio is a ratio of a number of input pixels to a number of output pixels.

13. An interpolation/decimation method according to claim 12, wherein said ratio is a ratio of the area corresponding to a pixel in an input image to the area corresponding to a pixel in an output image.

14. An image display apparatus, comprising:

interpolation/decimation means for generating a plurality of output data samples from a plurality of input data samples, each output data sample being generated by applying weighting coefficients to a subset of said input data samples such that for each said output data sample each of said input data samples of said subset is multiplied by a corresponding weighting coefficient and the resulting products are added together to generate said output data sample, and said weighting coefficients being generated based on phase information of said output data samples with respect to said input data samples and a ratio of the number of input data samples to the number of output data samples; and means for transmitting said output data samples to a display screen.

15. An image display apparatus according to claim 14, wherein said interpolation/decimation means is operable to enlarge or reduce image data corresponding to a predetermined area of said display screen.

* * * * *